United States Patent
Ledung et al.

(10) Patent No.: US 8,340,825 B2
(45) Date of Patent: Dec. 25, 2012

(54) METHOD AND DEVICE FOR CONTROLLING A PROCESS FOR BURNING A LIME CONTAINING MIXTURE TO BURNT LIME

(75) Inventors: Lars Ledung, Vasteras (SE); Erik Dahlqvist, Vasteras (SE)

(73) Assignee: ABB AB (SE)

( * ) Notice: Subject to any disclaimer, the term of this patent is extended or adjusted under 35 U.S.C. 154(b) by 0 days.

(21) Appl. No.: 13/342,585

(22) Filed: Jan. 3, 2012

(65) Prior Publication Data

US 2012/0143377 A1    Jun. 7, 2012

Related U.S. Application Data

(63) Continuation of application No. PCT/EP2009/058386, filed on Jul. 3, 2009.

(51) Int. Cl.
*G05B 21/00* (2006.01)

(52) U.S. Cl. ............ 700/274; 700/266; 202/92; 202/93; 202/211; 202/216; 202/218; 432/123; 432/136; 432/138

(58) Field of Classification Search .................. 700/266, 700/274; 202/92, 93, 211, 216, 218; 432/123, 432/136, 138
See application file for complete search history.

(56) References Cited

U.S. PATENT DOCUMENTS

| 3,273,874 | A |   | 9/1966 | Hucke |
| 4,536,253 | A | * | 8/1985 | Bertelsen .................... 162/30.11 |
| 5,213,663 | A | * | 5/1993 | Musow .......................... 162/49 |

FOREIGN PATENT DOCUMENTS

JP     11230676 A    8/1999

OTHER PUBLICATIONS

International Search Report and Written Opinion of the International Searching Authority; Application No. PCT/EP2009/058386; Issued: May 31, 2010; Mailing Date: Oct. 27, 2010; 17 pages.

* cited by examiner

*Primary Examiner* — Brian R. Gordon
*Assistant Examiner* — Shogo Sasaki
(74) *Attorney, Agent, or Firm* — St. Onge Steward Johnston & Reens LLC

(57) ABSTRACT

A method and a device for controlling a process for burning lime containing mixture ($CaCO_3$) and converting it to calcinated lime (CaO) in a rotary kiln, the rotary kiln having an elongated cavity surrounded by a wall and a burner arranged to heat the cavity. The method includes collecting measurement data of the temperature in the wall at a plurality of measuring points along the longitudinal axis of the cavity, predicting the actual temperature gradient along the longitudinal axis of the cavity based at least on the measurement data of the temperature in the wall, and by means of a thermal model describing the temperature along the cavity of the kiln, determining a desired temperature gradient along the cavity based on the predicted temperature gradient along the cavity and a predetermined control strategy controlling the temperature in the kiln.

9 Claims, 2 Drawing Sheets

METHOD AND DEVICE FOR CONTROLLING A PROCESS FOR BURNING A LIME CONTAINING MIXTURE TO BURNT LIME

CROSS-REFERENCE TO RELATED APPLICATIONS

The present application is a continuation of pending International patent application PCT/EP2009/058386 filed on Jul. 3, 2009 which designates the United States and the content of which is incorporated herein by reference.

FIELD OF THE INVENTION

The present invention refers to a method and a device for controlling a process for burning a lime containing mixture and converting it to burnt lime in a rotary kiln. The method is, for example, particularly useful in pulp mills (lime kilns) and in the cement industry.

BACKGROUND OF THE INVENTION

In the process for burning lime stone ($CaCO_3$) in the form of a lime containing mixture, also known as lime-slurry or lime-mud, to burnt lime (CaO), also denoted calcinated lime, the process equipment includes a rotary kiln modelled as a tube reactor. The lime containing mixture is introduced in one end, also denoted cold-end, of the kiln and fuel mixed with air is introduced in the other end, also denoted hot-end. The moisture of the lime containing mixture is evaporated nearly totally during the process.

The chemical process in the kiln is described as: $CaCO_3$+heat→$CaO$+$CO_2$

A known problem for rotary kilns used for burning a lime containing mixture is the formation of rings on the inside perimeter of the kiln. Rings are formed when inert substances in the lime melt and then stick to the wall of the inside perimeter of the kiln. Rings can also be built up of evaporated substances, which condense on the inner wall closer to the cold end of the kiln. A high alkali content of the lime containing mixture is one reason for this formation and can also increase the risk of sintering. The vapour condenses at a certain temperature (position) and rings tend to form at a certain position inside the perimeter of the kiln. One or more entrenchments can be built up at the same time depending on substances present and their concentrations. Behind such a ring, a "pool" of lime is built up and a natural flow of lime through the kiln is prevented. Another known problem is that mud balls are easily formed behind such a ring, which makes the burning of lime uneven and the result of this is unevenly burnt lime, i.e. large variations in the product quality and a far from optimum use of energy. Such rings and mud balls also cause inferior lime quality and can also interrupt the production of lime. Today, ring formations inside the kiln are commonly removed by shooting them away using guns. This causes an undesired interruption in the production of burnt lime.

SUMMARY OF THE INVENTION

It is an object of the present invention to reduce drawbacks of lime deposition inside the kiln.

According to a first aspect of the invention, this object is achieved by a method for burning a lime containing mixture and converting it to burnt lime in a rotary kiln.

The method comprises collecting measurement data of the temperature in the wall at a plurality of measuring points along the longitudinal axis of the cavity, predicting the actual temperature gradient along the longitudinal axis of the cavity based at least on the measurement data of the temperature in the wall, and by means of a thermal model describing the temperature along the cavity of the kiln, determining a desired temperature gradient along the cavity based on the predicted temperature gradient along the cavity and a predetermined control strategy for controlling the temperature in the kiln so that the area of deposition of lime on the inside of the walls of the kiln is controlled and the drawbacks of the lime deposition is reduced.

The temperature in the kiln varies along the length of the kiln. The temperature is highest at that end at which the burner is positioned (i.e. the hot-end) and the temperature decreases towards the end at which the lime mud is supplied (i.e. the cold-end). The ring formation is due to deposition of lime on the inside of the cavity and occurs at a certain temperature. Thus, the position of the ring formations depends on the temperature in the kiln. If the temperature is high and the residence time long enough, the deposited lime will start to sinter and form compounds that are insoluble in water. According to the invention, the actual temperature gradient along the longitudinal axis of the cavity of the kiln is predicted and a desired temperature gradient along the cavity is determined based on the predicted temperature and a predetermined control strategy. By a control strategy is meant a strategy for controlling where the lime deposition takes place in the cavity in order to reduce the drawbacks that occur due to the lime deposition. It is difficult to reduce or prevent the lime deposition. However, it is possible to alleviate the consequences of the lime deposition by controlling where and how the lime deposition takes place in the cavity. The control of where and how the lime deposition takes place in the cavity is made by controlling the temperature in the cavity. The control strategy may also include rules for the maximum temperature in the area of deposition in the kiln in order to prevent sintering of the deposited lime. Set-point values for supply of lime containing mixture and fuel to obtain the desired temperature gradient is determined based on the desired temperature gradient and the predicted temperature in the kiln.

By area of deposition is meant the area of the wall of the cavity at which deposition of lime may occur due to the current temperature conditions in the kiln.

Measuring the temperature inside the cavity is difficult. However, measuring the temperature in the wall of the kiln is much easier. According to the invention, the temperature inside the cavity is predicted based on a thermal model. The thermal model is adapted due to changing conditions over time by measuring the temperature in the wall at a plurality of positions along the kiln. This adaptation of the model is important to achieve correct predictions of the temperature inside the cavity.

According to an embodiment of the invention, the method comprises collecting measurement data of the supply of lime containing mixture to the kiln, collecting measurement data of the supply of fuel to said burner, predicting the actual temperature gradient along the longitudinal axis of said cavity based on the supply of lime containing mixture and on the supply of fuel, and determining set-point values for supply of lime containing mixture and supply of fuel to obtain the desired temperature gradient.

According to an additional embodiment of the invention, the control strategy is to keep the temperature in the area of deposition essentially at a constant level in order to concentrate the deposition of lime at a small area. If the temperature conditions in the kiln are very stable, the deposition of lime will be concentrated at a small area inside the cavity. Accordingly, the ring formation will become very thin and will break apart due to the transportation of lime mud through the kiln and/or due to its own weight. Thereby, undesired interruptions in the production of burnt lime due to ring formations in the cavity are reduced or even avoided.

According to another embodiment of the invention, the control strategy controls the temperature in the kiln so that the temperature in the area of deposition is varied in order to spread out the lime deposition over a large area. By deliberately varying the temperature in the area of deposition, the build-up of lime deposition inside the kiln will be spread out over a large area and accordingly the natural flow of lime through the kiln will not be significantly affected or prevented. Accordingly, the risk of production interruption is significantly reduced.

According to another embodiment of the invention, the control strategy controls the temperature in the kiln so that the temperature at the area of deposition is kept below a predetermined value. Thereby, the risk that the deposited lime should sinter is reduced and the risk that the natural flow of lime through the kiln should be significantly affected or prevented is reduced.

According to another embodiment of the invention, the control strategy controls the rotational speed of the rotary kiln in order to control the temperature and hence to control the deposition of inside the kiln.

According to a further embodiment of the invention, the method comprises determining the alkali content of the lime containing mixture during the washing, and if the alkali content is below a predetermined limit the washing is interrupted and the lime containing mixture is supplied to the kiln. If the alkali content of the lime containing mixture is high, the risk of ring formation as well as of sintering is increased. Further, if the content of alkali is too low there is a risk of dust formation, since nothing causes small particles to adhere to each other. According to this embodiment of the invention, the alkali content in the lime containing mixture supplied to the kiln is controlled by controlling the interruption of washing of the lime containing mixture. Thereby, the alkali content of the lime containing mixture is kept under control and hence the formation of rings, balls and dust can be reduced.

According to a further embodiment of the invention, the method comprises determining the alkali content of the lime containing mixture during the washing, and if the alkali content is below a predetermined limit the lime containing mixture is supplied to the kiln without interrupting the washing.

According to an embodiment of the invention, the method comprises measuring the electrical conductivity of filtrate from the washing and based thereon determining the alkali content of the lime containing mixture. The conductivity of the filtrate depends on the electrical conductivity in the water; high conductivity implies high alkali content and vice versa. The conductivity of the filtrate is quick and easy to measure, and accordingly this method for measuring the electrical conductivity of filtrate is quick and easy.

According to a second aspect of the invention, this object is achieved by a device for controlling a process for burning a lime containing mixture and converting it to burnt lime in a rotary kiln.

The device comprises a plurality of sensors adapted to measure the temperature in the kiln, the sensors being arranged in the wall of the kiln at a plurality of positions along the longitudinal axis of the cavity, and a control unit configured to:
collect measurement data of the temperature in the wall from the sensors,
predict the actual temperature gradient along the longitudinal axis of the cavity based at least on the measurement data of the temperature in the wall, and by means of a thermal model describing the temperature along the cavity of the kiln,
determine a desired temperature gradient along the cavity based on the predicted temperature gradient along the cavity and a predetermined control strategy for controlling the temperature in the kiln so that the area of deposition of lime on the inside of the walls of the kiln is controlled and drawbacks of the lime deposition are reduced.

According to an embodiment of the invention the control unit is configured to:
collect measurement data of the supply of a lime containing mixture to the kiln,
collect measurement data of the supply of fuel to said burner,
predict the actual temperature gradient along the longitudinal axis of said cavity based on the supply of the lime containing mixture and on the supply of fuel, and
determine set-point values for supply of lime containing mixture and supply of fuel to obtain the desired temperature gradient.

According to one further embodiment of the invention, the lime containing mixture is washed in a filter before being supplied to the kiln, the device comprises an apparatus for measuring the electrical conductivity of the filtrate from the washing, and the control unit is configured to:
receive measurement data of the electrical conductivity of the filtrate from the apparatus and based thereon determine the alkali content of the lime containing mixture,
determine when the alkali content is below a predetermined limit, and
generate a signal for interrupting the washing when the alkali content is below the predetermined limit.

BRIEF DESCRIPTION OF THE DRAWINGS

Other features and advantages of the present invention will become more apparent to a person skilled in the art from the following detailed description in conjunction with the appended drawing in which.

DETAILED DESCRIPTION OF THE INVENTION

Figure 1:
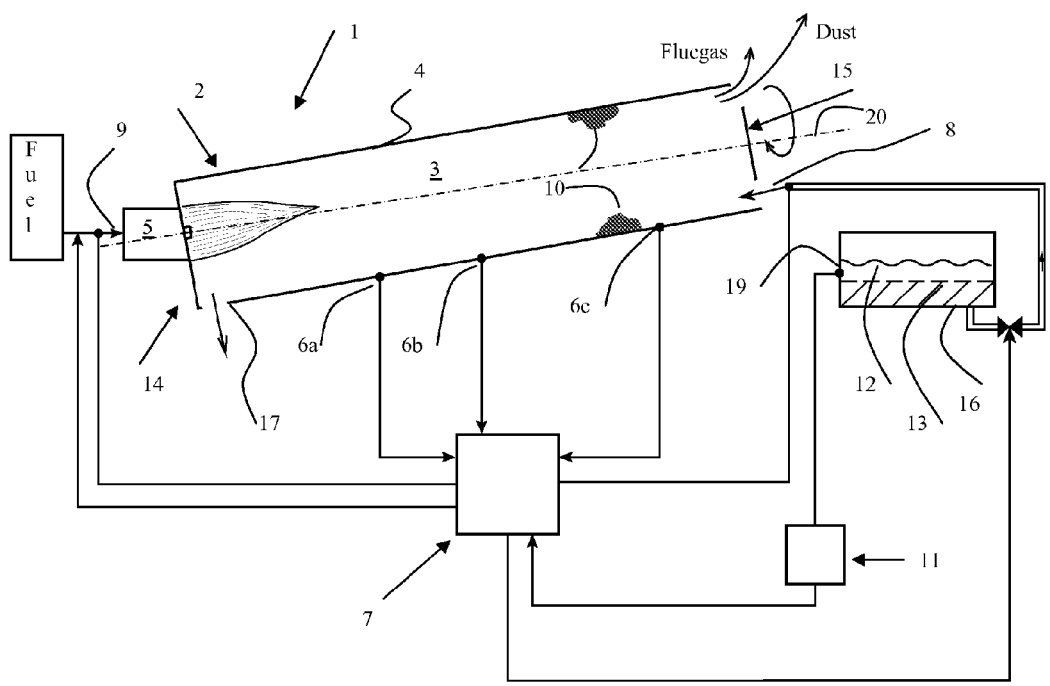
FIG. 1 shows a device for controlling a process for burning a lime containing mixture ($CaCO_3$) and converting it to calcinated lime (CaO) in a rotary kiln, according to an embodiment of the invention.

FIG. 1 shows a device 1 for controlling a process for burning a lime containing mixture ($CaCO_3$) and converting it to calcinated lime (CaO) in a rotary kiln 2, according to an embodiment of the invention. The device 1 is arranged to be used in association with pulp mills (lime kilns) or in the cement industry.

The device 1 comprises a rotary kiln 2 having an elongated cavity 3, comprising a plurality of volume elements, surrounded by a wall 4. The kiln 2 is a long steel tube lined with refractory bricks (not shown) and the length of the kiln 2 is typically 50-100 metres. The kiln 2 has a hot end 14 typically arranged with a burner 5 and means 17 for discharging burnt lime (CaO) from the cavity 3. The lime containing mixture ($CaCO_3$), with more or less water and impurities or additions including alkali salts and/or silica ($SiO_3$) is fed into the cavity 3 of the kiln 2 through charging means 8 by feeding means (not shown) such as a screw conveyor arranged at the cold-end 15 of the kiln 2. First water is evaporated into gas phase and thereafter the solids are heated and $CO_2$ is stripped off. Later on the temperature increases and alkali salts are evaporated. The kiln 2 has an incline of a few degrees towards the hot-end 14 and is slowly rotated about the longitudinal axis 20 of the cavity 3. The burner 5, arranged to heat the cavity 3 of the kiln 2 with hot flue-gases, is typically a gas or oil burner, but also other fuels such as bio fuels may be used. The lime containing mixture meets the hot flue-gases on its way through the cavity 3, and flue-gases and dust is discharged at the cold end 15 of the cavity 3 where dust is separated from the flue-gases in a particle filter (not shown). Further the device comprises a plurality of sensors 6*a-c* arranged in the wall 4 of the cavity 3, and adapted to measure the temperature in the kiln 2 at a plurality of different positions along the longitudinal axis 20 of the cavity 3. The device 1 also comprises a control unit 7, such as a computer or a PLC, arranged to the temperature in the kiln 2 according to a thermal model. The control unit 7 comprises a memory unit and a CPU and is configured to collect the temperature data in the cavity 3 of the kiln 2 measured by the sensors 6*a-c*. The control unit 7 is connected to the sensors 6*a-c* arranged in the wall 4 of the cavity 3, in order to collect temperature measurement data which is measured by the sensors 6*a-c* at a plurality of measuring points, in the wall 4, along the longitudinal axis 20 of the cavity 3. Further the control 7 is connected to the fuel pipe 9 of the burner 5 in order to regulate the fuel supply to the burner 5.

The actual temperature gradient along the longitudinal axis 20 of the cavity 3 is predicted based at least on the measurement data of the temperature in the wall 4. The temperature along the cavity 3 of the kiln 2 is described by means of a thermal model and a desired temperature gradient along the cavity 3 is determined based on the predicted temperature gradient along the cavity 3. A predetermined control strategy controls the temperature in the kiln 2 so that the area of deposition 10 of lime on the inside of the walls 4 of the kiln 2 is controlled and hence the drawbacks of lime deposition 10 are reduced. The predetermined control strategy is based on previous experiences on how to control the temperature in the kiln 2.

Washing of the lime containing mixture, which is optional and not always necessary, is performed in a filter 16 from which the lime containing mixture 13 is transported by transporting means (not shown) into the kiln 2. However, if washing is not performed no filter is used prior to the loading of lime containing mixture into the kiln 2. During washing the lime alkali content in the lime containing mixture 13 is controlled by measuring the electrical conductivity of the filtrate 12 from the washing, and hence washing control is achieved. Thereby, it is possible to determine the alkali content of the lime containing mixture 13. Low washing efficiency causes high alkali content in the lime containing mixture 13 which prevents dust problems but causes problems with ring formation on the inside perimeter of the kiln 2. However, if the washing is too effective the alkali content of the lime containing mixture 13 will be too low and thereby cause problems with dust formation, since nothing causes small particles to adhere to each other. The washing of the lime containing mixture is usually performed continuously but can also be performed batch wise. One or many sensors 19 are arranged in the filter 16 for the purpose of measuring the electrical conductivity of the filtrate 12 from the washing. Measurement data from the sensors 19 are processed in an apparatus 11 arranged for the purpose of determining the electrical conductivity of the filtrate 12 from the washing. The apparatus 11 is connected to the control unit 7. After washing the lime containing mixture is discharged from the filter 16 and eventually charged into the kiln 2 through the cold end 15.

By keeping the alkali content in the lime containing mixture at a correct level, e.g. around approximately 100 ppm, dust formation can be avoided, and also problems with ring formation. If the balance between the problems with dust and ring formation is maintained accurately most of the $CaCO_3$ can be reduced to CaO, without too much sintered material being formed.

The washing reactions are:

NaCO3+H2O+CaCO3→a) Lime containing mixture—i.e. $CaCO_3+H_2O$, and b) Filtrate—i.e. $NaOH+H_2O$ The alkali content is adjusted and controlled by measuring alkali in the filtrate 12, also known as waste-water or weak liquor. The concentration in the filtrate 12 is proportional to the content in the solid phase ($CaCO_3$). For the case with cement production, the alkali is controlled by adding specific additions, or by using a suitable mixture of bio fuels and other fuels, containing other ash components.

By measuring the mass flow (kg/s) of the lime containing mixture with additions as well as the fuel ash composition, the control unit 7 can use the temperature model to predict the material and energy balance along different parts of the kiln 2 along its length. This will give the temperature of solids, walls as well as gas components, along the kiln 2. Also the residence time at a specific temperature can be determined. From this and the composition of the solids with respect to e.g. alkali salts and silica, alumina and other metals, sintering amount, residual $CaCO_3$ etc. can be determined. The temperature model is controlled and adapted due to changing conditions with time by measuring the temperature at some positions along the lime kiln 2 through sensors, such as thermo couples, in the insulation ceramics i.e. the refractory bricks. This adaptation of the temperature model is important to obtain correct predictions.

The temperature model is based on collected measurement data of the temperature in the wall 4 at a plurality of measuring points along the longitudinal axis 20 of the cavity 3. Thereby it is possible to predict the actual temperature gradient along the longitudinal axis 20 of the cavity 3 based at least on the measurement data of the temperature in the wall 4. A thermal model describes the temperature along the cavity 3 of the kiln 2 and thereby a desired temperature gradient along the cavity 3 can be determined based on the predicted temperature gradient along the cavity 3 and a predetermined control strategy controlling the temperature in the kiln 2. Accordingly the area of deposition of lime on the inside of the walls 4 of the kiln 2 can be controlled and drawbacks of lime deposition are reduced.

The temperature model also depends on collected measurement data of the supply of lime containing mixture to the kiln 2 and the supply of fuel to said burner 5. Thereby, it is possible to predict predicting the actual temperature gradient along the longitudinal axis 20 of the cavity 3 based on the supply of a lime containing mixture and on the supply of fuel, and also to determine set-point values for supply of the lime containing mixture and supply of fuel to the burner 5 in order to obtain the desired temperature gradient in the kiln 2.

The temperature is primarily controlled by varying the fuel feed in relation to the feed of the lime containing mixture. Also, since fuel is mixed with air, the feed of air is controlled. However, this can also be combined with measuring the moisture content of the lime containing mixture and/or by varying the rotation speed of the kiln 2. The overall set-points for these actions are given by the temperature model combined with a number of local proportional-integral PI-controls.

Figure 2A:
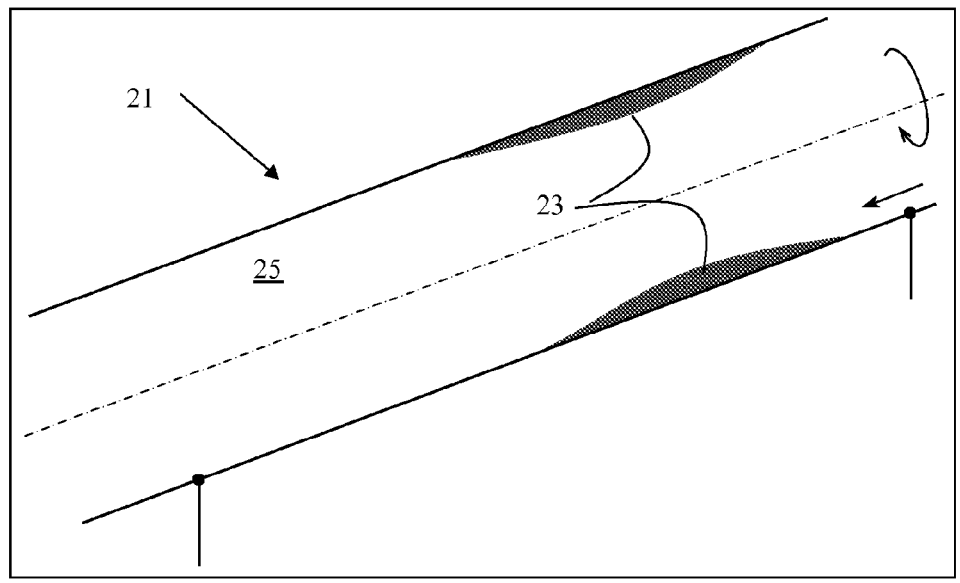
FIG. 2a shows part of the cavity and how lime is deposited inside the kiln when the area of lime deposition is large.

FIG. 2a shows when the predetermined control strategy controls the temperature in the kiln 21 so that the temperature in the area of deposition 23 in the kiln 21 is varied in order to spread out the lime deposition 23 over a large area. By deliberately varying the temperature in the area of deposition 23, the build-up of lime deposition 23 inside the cavity 25 of the kiln 21 will be spread out over a large area.

Figure 2B:
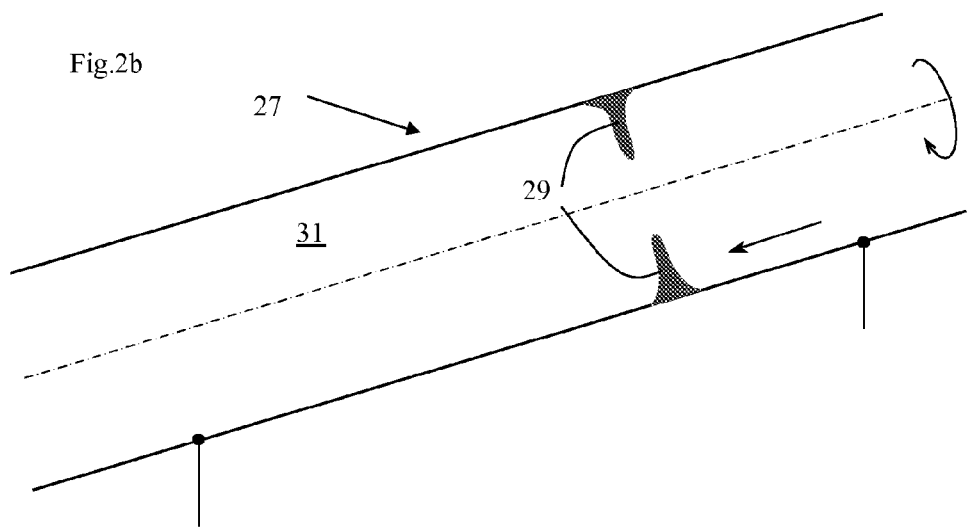
FIG. 2b shows part of the cavity and how lime is deposited inside the kiln when the area of lime deposition is small.

FIG. 2b shows when the predetermined control strategy controls the temperature in the kiln 27 so that the temperature in the area of deposition 29 in the kiln 27 is kept essentially at a constant level in order to concentrate the deposition 29 of lime at a small area. If the temperature conditions in the kiln 27 are very stable, the deposition 29 of lime will be concentrated at a small area inside the cavity 31.

The reactions are:

$$CaCO_3 \rightarrow CaO + CO_2$$

The reaction rate depends on temperature:

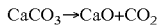

When $CO_2$ increases, the reaction rate decreases. When temperature increases, the reaction rate increases. The residence time in a certain volume element will also increase the conversion.

To heat material the energy balance is:

$$Q = F * Cp * (T_{gas} - T_{solids}), \text{ where } Q=(kW) \text{ and } F=(kg/s)$$

The heat transfer between the walls and the solids is given by:

$$Q = Area * Heat\_transfer\_rate * (T_{solids} - T_{wall})$$

There is a corresponding equation for heat transfer between gas and the wall.

The heat generated by the flames is given by:

$$Q = F * HHV$$

HHV is the higher heating value of the fuel mix. This means that if there are several fuels, the HHV is added for each fraction times the mass flow rate.

It is also possible to conduct other measurements, such as acoustic measurements for degree of sintering, dust content in the exhaust gases, torque/load of the motors arranged to rotate the kiln 2 or lime moisture content. An alternative control strategy is to implement a deliberate variation in dry solids content and kiln 2 temperature, e.g. sinoidal or similar, in order to obtain a varied temperature where the alkali vapour condensation occurs. The mixture of fuels, e.g. sulphur content, heating value etc, can also be controlled and hence also the residence time of the flue-gases. For similar control in cement kilns, the flow of additive chemicals should be closely controlled.

The present invention is not limited to the embodiments disclosed but a person skilled in the art may modify it in a plurality of ways within the scope of the invention as defined by the claims.

What is claimed is:

1. A method for controlling a process for supplying a lime containing mixture (CaCO3) to a rotary kiln, burning the lime containing mixture and converting it to calcinated lime (CaO) in the rotary kiln, said rotary kiln having an elongated cavity surrounded by a wall and a burner arranged to heat the cavity, characterised in that the method comprises:
    collecting measurement data of the temperature in the wall at a plurality of measuring points along the longitudinal axis of said cavity,
    predicting an actual temperature gradient along the longitudinal axis of said cavity based at least on said measurement data of the temperature in the wall, and by means of a thermal model describing the temperature along the longitudinal axis of said cavity of the kiln,
    determining a desired temperature gradient along the longitudinal axis of said cavity based on the predicted temperature gradient along the cavity and a predetermined control strategy controlling the temperature in the kiln so that the area of deposition of lime on the wall of the kiln inside said cavity is controlled and any drawbacks of the lime deposition are reduced; and
    controlling said burner to adjust the temperature in the kiln to the desired temperature gradient.

2. The method according to claim 1, characterised in that the method comprises:
    collecting measurement data of the supply of the lime containing mixture to the kiln,
    collecting measurement data of the supply of fuel to said burner,
    wherein said predicting the actual temperature gradient along the longitudinal axis of said cavity is based on the supply of the lime containing mixture and on the supply of the fuel, and
    determining set-point values for supply of the lime containing mixture and supply of the fuel to obtain the desired temperature gradient.

3. The method according to claim 2, characterised in that the method comprises:
    determining the rotation speed of said rotary kiln for controlling the temperature in the kiln.

4. The method according to claim 1, wherein the control strategy controls the temperature in the kiln so that the temperature in said area of deposition is kept essentially at a constant level in order to concentrate the lime deposition to a small area.

5. The method according to claim 1, wherein the control strategy controls the temperature in the kiln so that the temperature in said area of deposition is varied in order to spread out the lime deposition over a large area.

6. The method according to claim 1, wherein the control strategy controls the temperature in the kiln so that the temperature in said area of deposition is kept below a predetermined value.

7. The method according to claim 1, wherein the lime containing mixture is washed in a filter before being supplied to the kiln, and that the method comprises:
    determining the alkali content of the lime containing mixture during the washing,
    if the alkali content is below a predetermined limit, interrupting the washing and supplying the lime containing mixture to the kiln.

8. The method according to claim 1, wherein the lime containing mixture is washed in a filter before being supplied to the kiln, and that the method comprises:
    determining the alkali content of the a lime containing mixture during the washing,
    if the alkali content is below a predetermined limit, the lime containing mixture is supplied to the kiln without interrupting the washing.

9. The method according to claim 7, wherein the washing produces a filtrate, and the method further comprises measuring the electrical conductivity of the filtrate from the washing and based thereon determining the alkali content of the lime containing mixture.

* * * * *